United States Patent Office
3,297,500
Patented Jan. 10, 1967

3,297,500

METHOD OF PASSIVATING SEMICONDUCTOR DEVICES

Cyril Francis Drake and Kenneth Leopold Ellington, London, England, assignors to International Standard Electric Corporation, New York, N.Y., a corporation of Delaware No Drawing. Filed Feb. 7, 1964, Ser. No. 343,212
Claims priority, application Great Britain, Feb. 15, 1963, 6,257/63
6 Claims. (Cl. 148—174)

This invention relates to the manufacture of semiconductor devices, and particularly to protective surface treatment of semiconductor devices of the junction type.

In order to protect the surface of junction semiconductor devices from contamination during subsequent processing, storage and use, it is well known to coat the surface with a layer of protective inert material.

With silicon semiconductor devices for example this protective layer is commonly of a thermally produced silica film obtained by heating the device in an oxidizing atmosphere. The formation of this protective silicia film may be effected before, during or after the formation of the p–n junction or junctions required in the semiconductor device.

In the case of mesa type rectifiers for example, in which the mesa containing a p–n junction is first produced by any known method, and subsequently re-heated in an oxidising atmosphere to produce a protective silica film over the surface, it is found that, particularly in the case of rectifiers designed for operation with reverse voltages in excess of 500 volts, that the reverse current at a voltage below the breakdown voltage is many orders of magnitude larger after oxidation than before.

An object of the invention is to permit the oxidation step without incurring degradation of the p–n junction.

According to the invention there is provided a method of manufacturing a silicon p–n junction semiconductor device which includes the step of heating the said device in an oxidising atmosphere in the presence of vanadium or its compounds.

In the case of a silicon semiconductor device, in the temperature range in which oxidation of the silicon occurs at an appreciable rate in an oxidising atmosphere, the vanadium will be present as a higher oxide of vanadium, probably as vanadium pentoxide, $V_2O_5$. It has been found convenient to place a few milligrams of powdered metallic vanadium, ammonium vanadate or vanadium pentoxide beside the device to be oxidised on a flat silica boat, which is then inserted into a zone of an open-tube silica furnace maintained at 1200° C., through which oxygen containing water vapour with a partial pressure of 25 mm. is flowing. After heating for a period of time sufficient to produce a silica film of the order of 1 micron thick, the boat is slowly withdrawn from the furnace.

By way of an example, to show the improvement obtainable, a mesa type silicon rectifier prepared by etching and subsequently washing in deionized water was heated in a stream of oxygen containing water at a partial pressure of 25 mm. Before oxidising the device passed a reverse current of 1$\mu$A at 450v., subsequent to oxidation a reverse current of 5ma. at 100v.

A similar device oxidised for the same time in the same atmosphere, but in the presence of $V_2O_5$ maintained at 1200° C. showed a reverse characteristic substantially unchanged by the oxidation process.

The step of heating the silicon semiconductor device in an oxidising atmosphere in the presence of vanadium or its compounds may be carried out after the formation of the required p–n junction or junctions, as described above, during, or before the formation thereof.

What we claim is:

1. A method of passivating a silicon semiconductor device which includes the step of heating the said device in an oxidising atmosphere in the presence of a substance selected from the grouping consisting of vanadium and its compounds.

2. A method of passivating a silicon semiconductor device which includes the step of heating said device in an oxidising atmosphere including vanadium pentoxide.

3. A method according to claim 1 in which said device is heated in the presence of vanadium pentoxide.

4. A method according to claim 1 in which said device is heated in the presence of ammonium vanadate.

5. A method of passivating a silicon semiconductor device, by heating said device together with a few milligrams of vanaidum pentoxide to a temperature of 1200° C. in an atmosphere of oxygen containing water vapour, and maintaining said temperature for a period of time sufficient to produce a protective silica film on said device.

6. A method according to claim 1 wherein said substance is heated to substantially the same temperature as said device.

References Cited by the Examiner

UNITED STATES PATENTS

| | | | |
|---|---|---|---|
| 2,794,846 | 6/1957 | Fuller | 117—200 |
| 2,816,850 | 12/1957 | Haring | 117—200 |
| 2,891,203 | 6/1959 | Thornton | 117—200 |
| 2,989,424 | 6/1961 | Angello | 117—200 |

HYLAND BIZOT, *Primary Examiner.*

DAVID L. RECK, N. F. MARKVA, *Assistant Examiners.*